Aug. 5, 1958  R. E. BOWEN  2,845,848
APPARATUS FOR SCREENING PULP
Filed Jan. 23, 1956  2 Sheets-Sheet 1
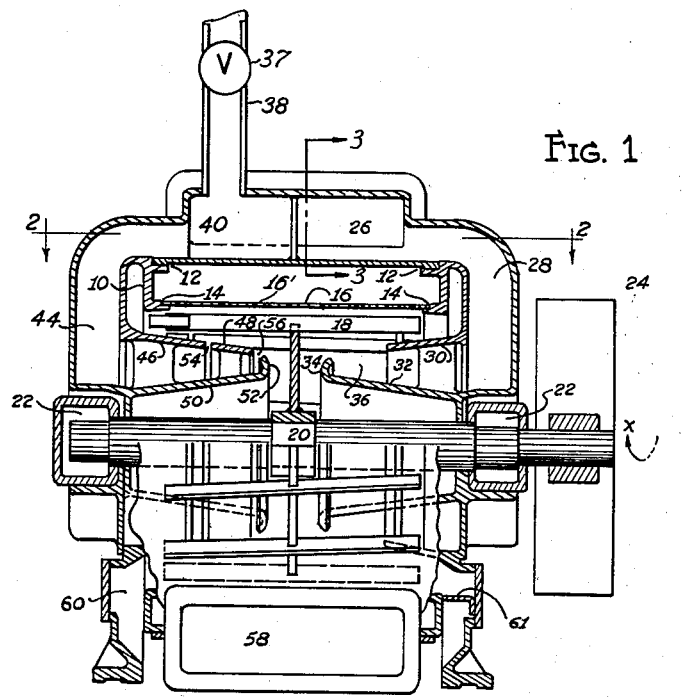
Fig. 1
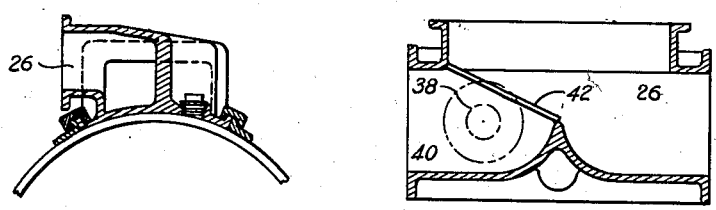
Fig. 2
Fig. 3
ROBERT H. BOWEN
    *INVENTOR.*
BY Aug. 5, 1958 R. E. BOWEN 2,845,848
APPARATUS FOR SCREENING PULP
Filed Jan. 23, 1956 2 Sheets-Sheet 2

ROBERT H. BOWEN
INVENTOR.

United States Patent Office 2,845,848
Patented Aug. 5, 1958

2,845,848

APPARATUS FOR SCREENING PULP

Robert E. Bowen, Plymouth, N. C., assignor to North Carolina Pulp Company, Merchantville, N. J., a corporation of Delaware Application January 23, 1956, Serial No. 560,564

8 Claims. (Cl. 92—34)

It is an object of this invention to provide an improved pulp screen having increased capacity over screens of the same size containing the same number of equal perforations.

It is a further object of this invention to provide a screen as aforesaid capable of screening stock at higher consistency than hitherto has been considered possible with this operation.

It is a further object of this invention to provide a screen as aforesaid which will operate at greatly reduced power per ton of pulp handled.

It is a further object of this invention to provide a screen as aforesaid in which dilution water may be supplied under minimum head.

It is a further object of this invention to provide a screen as aforesaid which in comparison with existing screens may be considered self-cleaning.

It is a further object of this invention to provide a screen as aforesaid in which the richness of the rejects easily and accurately may be controlled.

The above and other objects will be made clear from the following detailed description taken in connection with the annexed drawings in which:

Fig. 1 is a vertical section through the axis of the improved screen;

Fig. 2 is a section on the line 2—2 of Fig. 1;

Fig. 3 is a section on the line 3—3 of Fig. 1;

Figure 5:
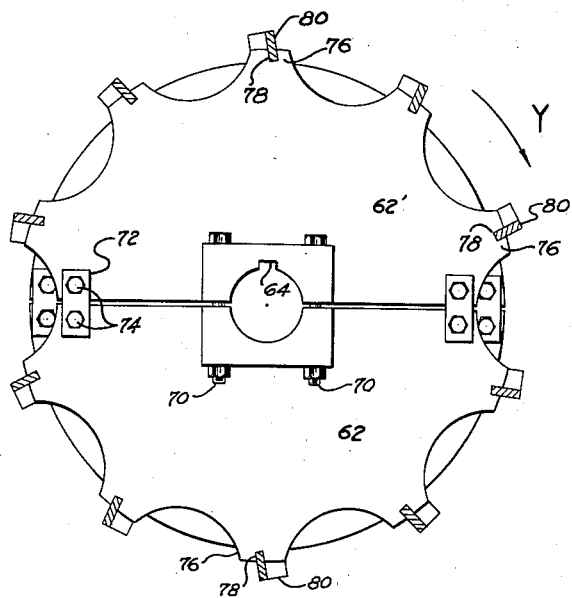
Fig. 5 is a section on the line 5—5 of Fig. 4.

In a pulp mill, screening is done to separate coarser fibers from the fine or majority fibers and to remove dirt and foreign matter. The accepted fibers pass through the screen, the objectionable particles are retained by the screen. This is sharply to be distinguished from the mechanically similar operation of deckering or de-watering, in which almost all fibers are retained on the screen and only the water passes through the screen.

The size of the screen, the speed of the rotor and the size and shape of the screen perforations will vary with the type of pulp being screened. The specific dimensions, speeds and consistencies etc. appearing hereinafter are based on the screening of pre-refined pine kraft stock, cooked to a permanganate number of 38-40. For other pulps, the quantities would be different but this disclosure will enable anyone skilled in the art to arrive at optimum quantities for any other pulp. This particular stock, due to the pre-refinement, makes it exceptionally difficult to keep the plates clean. It contains numerous "stringy" fibers which in screens of the prior art quickly results in a densely matted and knitted layer of fibers over the entire perforated plate surface. Using the present invention, however, at the end of 240 hours (10 days) of continuous operation, 95% of the perforations have been found to be clean.

Referring now to Fig. 1, there is shown a casing 10, in which is formed a pair of outer cylindrical flanges 12, and a pair of inner cylindrical flanges 14. Cylindrical screen plates 16 having perforations 16' are secured at opposite ends to the inner flanges 14 and completely surround a rotor generally designated as 18, which is mounted on a shaft 20. The shaft 20 is supported in bearings 22 and is driven in the direction of the arrow X by a pulley 24.

Unscreened stock enters through an inlet passage 26 shown in Figs. 2 and 3 and proceeds through a stock inlet channel 28. It is directed to the interior of the screen 16 through a tapering channel made up of an outer frusto-conical portion 30 and an inner frusto-conical portion 32, having at its inner end an outwardly directed flange 34. The flange 34 with the inner rim of the portion 30 defines a sizable inlet opening 36.

A pipe 38 shown in Figs. 1 and 2, supplies dilution water to a chamber 40, which is separated from the stock inlet passage by a partition 42. The dilution water proceeds through a channel 44 to a tapering inlet channel defined by an outer frusto-conical member 46, a second outer frusto-conical member 48 and an inner frusto-conical member 50 having at its inner end an outwardly extending flange 52. A dilution water orifice 54 is formed as a gap between the outer members 46 and 48 and an additional orifice is formed as a gap 56 between the outer member 48 and the flange 52.

Accepted stock passing through the screen 16 emerges through an outlet 58, while rejects emerge through a rejects receiving chamber 60 at the left end of Fig. 1. Rejects are prevented from leaving the righthand end of Fig. 1 by a casing 61.

Figure 6:
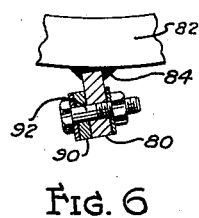
Fig. 6 is a section on the line 6—6 of Fig. 4.
Figure 4:
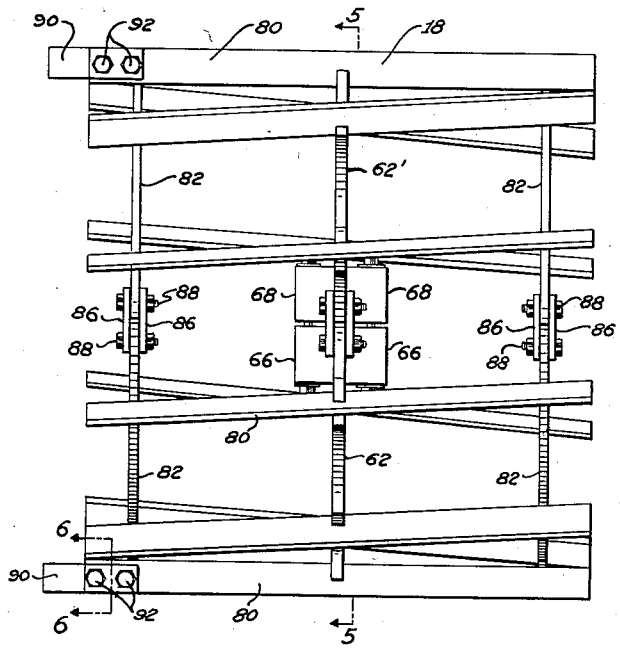
Fig. 4 is an elevation of the rotor.

The rotor 18 is shown in detail in Figs. 4, 5 and 6. It is made up of a pair of semi-circular baffle plates 62 and 62'. Each has at its center a portion cut away to receive the shaft 20 and in addition to the plate 62' has formed in it a keyway 64. A pair of bosses 66 are welded to the plates 62 and a similar pair of bosses 68 are welded to the plate 62'. The bosses 66 and 68 are drawn together by through-bolts 70. Adjacent their outer peripheries the plates 62 and 62' are secured by straps 72 and bolts 74.

The outer periphery of both plates is formed into equally spaced bosses 76 and in each boss 76 is formed a central slot 78. The slots 78 receive rotor blades 80 which are welded in place. All points on the edges of the blades 80 are equidistant from the axis of the shaft 20 but the blades are slightly pitched from left to right as shown in Fig. 4 and are swept back or sloped about 10 degrees toward the trailing side of the arrow Y, which in Fig. 5 denotes the direction of rotation. It will be noted that the pitch of the blades 80 is such as to feed stock from right to left in Figs. 1 and 4.

Adjacent their ends the blades 80 are supported by semi-circular rings 82 to which they are welded as indicated at 84 in Fig. 6. A pair of semi-circular rings at each end are connected by straps 86 and bolts 88.

The above described construction provides a rotor separable into halves so that it may be installed in or removed from the machine without dismounting the shaft.

On two diametrically opposed blades 80 are mounted reject clearing clips 90 secured by bolts 92 and extending leftward beyond the ends of the blades 80.

In the case of the above described pre-refined pulp, the screen plates 16 will contain perforations of .125 inch in diameter and the rotor will operate at from 300 to 350 R. P. M. Unscreened stock at a consistency of 1.25% to 1.5%, entering through the orifice 36, is temporarily restrained from axial progress by the baffle defined by plates 62 and 62'. The rotor blades 80 exert a centrifugal pressure tending to force the stock through the perforations and, due to their pitch, also tend to feed stock axially over the baffle. There it is mixed with dilution water flowing through the orifices 54 and 56. At an output of 125 tons/day only 70 to 80 gallons per minute of dilution water are needed. The rotors 80 effect a thorough mixing of dilution water with the stock and continue to force acceptable fiber through the perforations. As rejected stock moves beyond the lefthand ends of the blades 80 it is kept agitated by the clearing clips 90, thus eliminating the need for wash nozzles.

The hydraulic action of the blades is of great importance. Ten blades are provided (not a critical number) and this means that each longitudinal element of the screen is subjected to blade action from 50 to 60 times per second. The slight rearward slope of the blades tends to lift stock radially toward the screen but this is followed immediately by a reverse or suction effect away from the screen due to cavitation. This action, of course, would not take place if the stock were swirling at the same speed as the blades. Here again the slope is important since it facilitates "slip" between the blades and the stock. The stock swirls, to be sure and this contributes centripetal force to accelerate the screening action. The blades, however, move faster than the stock and thus produce the above described action.

A valve 37 is placed in the pipe 38 ahead of the dilution inlet chamber 40. It has been found that the dilution water functions very well and effectively under heads as low as 5 p. s. i. and at such a low head, or for that matter at much higher heads, only minor adjustments of the valve in pipe 38 suffice to control the richness of the rejects, that is the amount of good fiber leaving the machine with the rejects.

By supplying dilution water on the side of the baffle defined by plates 62 and 62' opposite the side which receives the unscreened stock there is achieved a two stage washing. In effect, the stock is concentrated before it passes over the baffle. Thereafter it is rediluted and the dilution water washes much acceptable fiber through the screen and out of the rejects. Since the dilution water is not used to clean the screen, this being done by the rotor blades, low pressure may be used with a saving of pumping costs.

At this stage of development, it would be futile to theorize on precisely why the above described invention produces such improved results. Improved results are produced, however, as the following actual comparative data will show. The comparison is between identical cylindrical screens containing the same number of 1/8 inch perforations and operating on identical pulps.

| | Prior Art | Present Invention |
|---|---|---|
| Ton/Day | 65 | 125 |
| Inlet Cons., percent | 0.55-0.6 | 1.25-1.5 |
| Gals./Ton | 43,283-39,657 | 18,911-15,719 |
| Dil., Gals./Ton | | 686-927 |
| Total Gals./Ton | 43,285-39,657 | 19,597-16,646 |
| H. P., hour/Ton (rotor) | .77 | .256 |
| Total Gals./Minute | 1,953-1,790 | 1,701-1,445 |

It is particularly noteworthy that the total gallons per minute is lower at both ends of the consistency range of the present invention than the lowest gallons per minute at the highest consistency permissible under prior practice. This lower total gallons per minute of itself probably accounts for the 2/3 saving in the horsepower category. This saving, of course, also arises from the fact that a great deal more pulp is screened while the rotor is moving less total gallonage than is the case with the prior art.

As previously noted, specific dimensions, consistencies and rates of flow will be required to provide an optimum combination for any particular pulp and the mechanical details above described are susceptible of considerable variation without departure from the spirit of this invention. Accordingly, the invention is not to be limited to the details disclosed herein but only as set forth in the subjoined claims.

I claim:

1. A pulp screen comprising: a cylindrical perforated screen; a rotatable shaft mounted axially of said screen; blades adjacent said screen; a baffle plate secured to said blades and said shaft; a tapering channel surrounding said shaft on one side of said baffle plate; a second tapering channel surrounding said shaft on the opposite side of said baffle plate, both of said channels having outlets in communication with the interior of said screen, said outlets being adjacent said blades; means for delivering unscreened stock to the first named channel; means for delivering dilution water to said second channel, said blades being so pitched as, upon rotation, to feed unscreened stock over said baffle plate and into admixture with said dilution water.

2. A pulp screen as set forth in claim 1 in which all points on the edge of said blades are equidistant from the axis of said shaft and said blades are swept back from the direction of rotation.

3. A pulp screen as set forth in claim 1 including a rejects receiving chamber surrounding said second named channel, said chamber having an outlet, and a pair of clips secured to diametrically opposed blades for rotation within said chamber.

4. A pulp screen as set forth in claim 1 including means to adjust the rate of flow of said dilution water.

5. A pulp screen as set forth in claim 4 in which all points on the edge of said blades are equidistant from the axis of said shaft and said blades are swept back from the direction of rotation.

6. A pulp screen as set forth in claim 4 including a rejects receiving chamber surrounding said second named channel, said chamber having an outlet, and a pair of clips secured to diametrically opposed blades for rotation within said chamber.

7. A pulp screen as set forth in claim 6 in which all points on the edge of said blades are equidistant from the axis of said shaft and said blades are swept back from the direction of rotation.

8. A pulp screen comprising: a cylindrical perforated screen; a rotatable shaft mounted axially of said screen; blades adjacent the full axial length of said screen; a baffle plate secured to said blades and said shaft; an inlet channel on one side of said baffle plate; a second channel on the opposite side of said baffle plate, both of said channels having outlets in communication with the interior of said screen, said outlets being in part at least adjacent said blades; means for delivering unscreened stock to the first named channel; means for delivering dilution water to said second channel, said blades being so pitched as, upon rotation, to feed unscreened stock over said baffle plate and into admixture with said dilution water.

References Cited in the file of this patent

UNITED STATES PATENTS

| 469,495 | Ziegler | Feb. 23, 1892 |
| 1,639,273 | Reed et al. | Aug. 16, 1927 |
| 1,714,047 | Reed et al. | May 21, 1929 |
| 1,932,663 | Haug | Oct. 31, 1933 |
| 2,056,310 | Palmer | Oct. 6, 1936 |
| 2,246,669 | Cowan | June 24, 1941 |
| 2,337,113 | Knight | Dec. 21, 1943 |
| 2,347,716 | Staege | May 2, 1944 |